(12) United States Patent
Becker et al.

(10) Patent No.: US 7,636,374 B2
(45) Date of Patent: Dec. 22, 2009

(54) HARDWARE APPARATUS FOR CONDITIONING PILOT SYMBOLS FOR CHANNEL ESTIMATION USING ADAPTIVE LOW-PASS FILTERING

(75) Inventors: Burkhard Becker, Ismaning (DE); Robert Denk, Grafing (DE)

(73) Assignee: Infineon Technologies AG (DE)

( * ) Notice: Subject to any disclaimer, the term of this patent is extended or adjusted under 35 U.S.C. 154(b) by 861 days.

(21) Appl. No.: 10/850,484

(22) Filed: May 20, 2004

(65) Prior Publication Data

US 2004/0240589 A1 Dec. 2, 2004

(30) Foreign Application Priority Data

May 21, 2003 (DE) ................. 103 22 943

(51) Int. Cl.
*H04J 1/02* (2006.01)
(52) U.S. Cl. .................. 370/497; 370/290; 370/335; 370/491
(58) Field of Classification Search .......... 370/500, 370/412, 413, 417, 235, 236.1, 236.2, 497, 370/290, 335, 491
See application file for complete search history.

(56) References Cited

U.S. PATENT DOCUMENTS

| | | | | |
|---|---|---|---|---|
| 5,592,340 A * | 1/1997 | Minuhin et al. | ............... | 360/46 |
| 5,619,524 A * | 4/1997 | Ling et al. | ................... | 375/130 |
| 5,737,327 A * | 4/1998 | Ling et al. | ................... | 370/335 |
| 5,777,511 A * | 7/1998 | Masumoto et al. | .......... | 329/304 |
| 5,799,011 A * | 8/1998 | LaRosa et al. | ............... | 370/335 |
| 5,991,332 A * | 11/1999 | Lomp et al. | ................. | 375/152 |
| 6,067,292 A * | 5/2000 | Huang et al. | ................ | 370/342 |
| 6,178,194 B1 * | 1/2001 | Vasic | ......................... | 375/136 |
| 6,192,040 B1 * | 2/2001 | Jalloul et al. | ................ | 370/335 |
| 6,483,821 B1 * | 11/2002 | Dabak et al. | ................ | 370/329 |
| 6,633,552 B1 * | 10/2003 | Ling et al. | ................... | 370/318 |
| 6,680,967 B1 * | 1/2004 | Westman | ..................... | 375/148 |
| 6,700,919 B1 * | 3/2004 | Papasakellariou | ........... | 375/130 |
| 6,754,286 B2 * | 6/2004 | Hottinen et al. | ............. | 375/299 |
| 6,757,272 B1 * | 6/2004 | Abeta et al. | ................. | 370/342 |
| 6,801,564 B2 * | 10/2004 | Rouphael et al. | ............ | 375/142 |
| 6,816,541 B1 * | 11/2004 | Schmidl | ..................... | 375/148 |

(Continued)

FOREIGN PATENT DOCUMENTS

DE 102 50 361 A1 5/2004

(Continued)

OTHER PUBLICATIONS

Li et al. ("An Adaptive Filter Technique for Pilot Aided Transmission Systems"); 1990; IEEE; pp. 507-512.*

(Continued)

*Primary Examiner*—Ricky Ngo
*Assistant Examiner*—Dewanda Samuel
(74) *Attorney, Agent, or Firm*—Dickstein, Shapiro, LLP.

(57) ABSTRACT

A hardware apparatus (10) for conditioning pilot symbols for channel estimation in a mobile radio comprises a time-division multiplexed low-pass filter unit for filtering the received pilot symbols. The time-division multiplexed low-pass filter unit comprises, between its input and its output, a feedback path which can be switched in and which can be used to implement a plurality of filter stages in a time-division multiplexed arrangement.

22 Claims, 5 Drawing Sheets

U.S. PATENT DOCUMENTS

| | | | | |
|---|---|---|---|---|
| 6,980,584 | B1* | 12/2005 | Yaguchi | 375/148 |
| 7,082,174 | B1* | 7/2006 | Smee et al. | 375/349 |
| 7,158,770 | B2* | 1/2007 | Hanaoka et al. | 455/226.1 |
| 7,173,991 | B2* | 2/2007 | Scarpa | 375/350 |
| 7,295,631 | B2* | 11/2007 | Wildhagen | 375/316 |
| 7,349,379 | B2* | 3/2008 | Schmidl et al. | 370/342 |
| 2002/0159507 | A1* | 10/2002 | Flaig et al. | 375/148 |
| 2003/0021334 | A1 | 1/2003 | Levin et al. | 375/147 |
| 2003/0072277 | A1* | 4/2003 | Subrahmanya et al. | 370/320 |
| 2003/0118085 | A1* | 6/2003 | Taipale et al. | 375/150 |
| 2003/0165202 | A1* | 9/2003 | Park | 375/324 |
| 2003/0169804 | A1* | 9/2003 | Kudumakis et al. | 375/143 |
| 2004/0196935 | A1* | 10/2004 | Nieto | 375/350 |

FOREIGN PATENT DOCUMENTS

WO  WO 00/67389  * 11/2000

OTHER PUBLICATIONS

Oh et al. "An Adaptive Channel Estimation Scheme for DS-CDMA Systems"; 2000; IEEE; pp. 2839-2843.*

Alan V. Oppenheim et al.; "Discrete-Time Signal Processing"; 2nd Ed.; Prentice Hall; pp. 354-366, 1998.

* cited by examiner

HARDWARE APPARATUS FOR CONDITIONING PILOT SYMBOLS FOR CHANNEL ESTIMATION USING ADAPTIVE LOW-PASS FILTERING

PRIORITY

This application claims priority to German application no. 103 22 943.4 filed May 21, 2003.

TECHNICAL FIELD OF THE INVENTION

The present invention relates to a hardware apparatus which is used to condition pilot symbols, which have been transmitted by a base station and have been received by a mobile radio and are also known to the mobile radio, for channel estimation by means of adaptive low-pass filtering.

BACKGROUND OF THE INVENTION

In mobile radio systems, the signal propagation occurs in the form of multiway paths whose influence on the signal can be described in a form of a linear transformation which varies over time. Such signal distortions make correct detection of the data transferred between the base station and the mobile radio impossible. For this reason, the channel distortions in the case of data transfer based on the UMTS (Universal Mobile Telecommunications System) standard, for example, are estimated using a pilot signal (Common Pilot Channel; CPICH). The pilot signal is a signal which is transmitted by the base station and is used for continuously transmitting the same pilot symbol or a continuously recurring pattern comprising two different pilot symbols.

In one simple channel model, the symbols $r_k$ received by the mobile radio can be described mathematically in the following manner:

$$r_k = s_k \cdot c_k + n_k \quad (1)$$

In equation (1), $s_k$ represents the symbols transmitted from the base station, $c_k$ represents the channel parameter and $n_k$ represents a noise component. The channel parameter $c_k$ describes the rotation-stretching for the symbols $s_k$ in the transmission channel. The integer index k indicates the chronological order of the symbols. All variables in equation (1) represent complex numbers.

Equation (1) also applies to the pilot symbols transmitted. If the noise component $n_k$ is ignored, then it is possible to ascertain the channel parameter $c_k$ by multiplying the received pilot symbols $r_k$ by the complex-conjugate known pilot symbols $s_k$. The channel parameter $c_k$ obtained in this manner can be used to eliminate the influence of the transmission channel on the transmitted symbols after they have been received in the mobile radio in line with equation (1). However, physical effects (in the radio frequency receiver, inter alia) mean that the signals received are subject to noise, meaning that the channel parameter $c_k$ can be estimated only with finite accuracy.

The German patent application with the file reference 102 50 361.3-35 allocated by the German Patent and Trade Marks Office proposes a cascaded and adaptive structure of low-pass filter units which is used to filter the pilot symbols received by the mobile radio. This allows a considerable improvement in the accuracy of the channel estimation. The aforementioned patent application is incorporated hereby in the disclosed content of the present patent application.

SUMMARY OF THE INVENTION

It is an object of the invention to provide a hardware apparatus which conditions the pilot symbols in optimum fashion for channel estimation and which can nevertheless be produced with as little complexity as possible. In this case, the target variable to be minimized is the chip area for the hardware unit. In addition, the intention is to specify a method for operating the hardware unit. The intention is also to provide a channel estimator which comprises the hardware apparatus and is integrated in the hardware of the mobile radio in a suitable manner.

The object on which the invention is based can be achieved by a hardware apparatus for conditioning pilot symbols for channel estimation, wherein the pilot symbols are transmitted by a base station and are received by a mobile radio, and the pilot symbols are known to the mobile radio, comprising a time-division multiplexed low-pass filter unit for filtering the received pilot symbols, the time-division multiplexed low-pass filter unit comprising, between its input and its output, a feedback path which can be switched in.

The object can also be achieved by a method for operating a hardware apparatus for conditioning pilot symbols for channel estimation, wherein the pilot symbols are transmitted by a base station and are received by a mobile radio, and the pilot symbols are known to the mobile radio, wherein the apparatus comprises a time-division multiplexed low-pass filter unit comprising an IIR low-pass filter, and between its input and its output, a feedback path which can be switched in, a first buffer store for providing first values for main registers in the IIR low-pass filter, and a second buffer store for buffer-storing second values which are output from the main registers in the IIR low-pass filter, the method comprising the steps of:

(1) loading first values from the first buffer store into the main registers in the IIR low-pass filter;

(2) filtering a pilot symbol in the IIR low-pass filter;

(3) storing at least some of the second values output from the main registers in the second buffer store; and (4) repeating method steps (1) to (3) at least once, with the feedback path which can be switched in supplying the result of the filtering from method step to the IIR low-pass filter instead of the pilot symbol.

The feedback loop which can be switched in can be used to produce at least two low-pass filter stages in time-division multiplex mode with various filter coefficients and scaling factors. The hardware apparatus may further comprise a multiplexer which is connected upstream of the low-pass filter unit, a first input on the multiplexer being coupled to the output of the low-pass filter unit, and a second input on the multiplexer being able to be fed the received pilot symbols. The low-pass filter unit may have an IIR low-pass filter which can be used to produce at least two filter stages in time-division multiplex mode. The hardware apparatus may further comprise a first buffer store for providing first values for main registers in the IIR low-pass filter, and a second buffer store for buffer-storing second values which are output from the main registers in the IIR low-pass filter. A pilot symbol filtered using the IIR low-pass filter can be stored in the second buffer store. The function of the first buffer store can be interchanged with the function of the second buffer store. The hardware apparatus may further comprise first registers storing filter coefficients, the low-pass filter unit being fed, during its operation, with the filter coefficients which are stored in the first registers, and second registers, in which it is possible to store filter coefficients during the operation of the low-pass filter unit, the functions of the first registers and of the second registers being interchangeable. The hardware apparatus may further comprise a digital signal processor for generating the filter coefficients. The hardware apparatus may condition the pilot symbols received by various RAKE fingers in a time-division multiplex mode. The hardware apparatus may further comprise a control unit for controlling the hardware apparatus, the control unit activating and deactivating the low-pass filter unit, in particular, and/or determining the number of feedback loops and filter stages through which a pilot symbol needs to pass and/or supplying the filtered pilot symbol or a default value, particularly the value "0", to a downstream unit, particularly an MRC unit. The hardware apparatus may further comprise a unit for determining the relative speed of the mobile radio with respect to the base station, and/or a unit for determining the signal-to-noise ratio which is present at the receiver end, wherein the number of feedback loops or filter stages through which a pilot symbol needs to pass in the low-pass filter unit is dependent on the relative speed and/or the signal-to-noise ratio.

The object may further be achieved by a channel estimator comprising a computation unit for multiplying received pilot symbols by complex-conjugate known pilot symbols and a hardware apparatus as described above, wherein the computation unit and the hardware apparatus being connected in series.

The noise produced in the mobile radio receiver is distributed with spectral uniformity over the bandwidth of the pilot signal and can be significantly reduced in power by means of low-pass filtering. When subjecting the pilot symbols to low-pass filtering, however, it should be noted that the low-pass filtering results in propagation-time delays. Without further measures, pure low-pass filtering sometimes results in the channel estimation being worsened, since after the low-pass filtering the transmission of the pilot symbols used may be so far back in time that the channel state has already altered noticeably. It is therefore necessary to find a compromise between low-pass filtering and propagation-time delay.

The inventive hardware apparatus takes into account the channel dynamics using adaptive low-pass filtering. To filter the pilot symbols transmitted by the base station and received by the mobile radio, the inventive hardware apparatus has a low-pass filter unit which is operated with N-fold time-division multiplexing and thus delivers the same results as a low-pass filter unit having N filter stages. The time-division multiplex mode is implemented by a feedback path which can be switched in.

The feedback path, which can be switched in allows the pilot symbols received to be able to pass through the low-pass filter unit N times (in a corresponding manner to N filter stages) and to be subjected to corresponding filtering. The number of times that the pilot symbols pass through the low-pass filter unit can be matched to the channel dynamics. This allows the pilot symbols received to be conditioned in optimum fashion for the channel estimation using the inventive hardware apparatus.

In addition, the inventive hardware apparatus has the advantage that it requires only one time-division multiplexed low-pass filter unit instead of N filter stages provided in hardware. This means that the chip area is reduced in comparison with a low-pass filter unit having N filter stages.

Advantageously, the feedback loop which can be switched in makes it possible to produce at least two filter stages in time-division multiplex mode with different filter coefficients and scaling factors.

In line with one preferred refinement of the invention, the feedback path which can be switched in is produced using a multiplexer which is connected upstream of the low-pass filter unit. A first input on the multiplexer is connected to the output of the low-pass filter unit, at which the filtered pilot symbols are output. The received, still unfiltered pilot symbols are input into a second input on the multiplexer. The multiplexer's setting determines whether the last pilot symbol filtered is to pass through the low-pass filter unit again or whether a still unfiltered pilot symbol needs to be filtered for the first time.

Preferably, the time-division multiplexed low-pass filter unit contains an IIR (Infinite Impulse Response) low-pass filter which can be used to produce at least two filter stages in time-division multiplex mode.

In one particularly preferred refinement of the invention, the hardware apparatus has a first and a second buffer store. In order to filter a pilot symbol, the first buffer store provides for first values which are loaded into the main registers (delay elements) in one of the at least two filter stages in the IIR low-pass filter. When a pilot symbol has been filtered, at least some of the results from a filter stage in the IIR low-pass filter, which results are contained in the main memories (delay elements), are stored in the second buffer store as second values.

Advantageously, the filtered pilot symbols are also buffer-stored in the second buffer store.

Storing the second values which have come from the filter stages (results of filtering) and the filtered pilot symbols allows a high degree of flexibility for the hardware apparatus, since it is possible to access the stored second values and the filtered pilot symbols again at a later time, and they can be fed into the filter stages in the IIR low-pass filter again, for example.

For the purpose described above, it is advantageous that the function of the first buffer store can be interchanged with the function of the second buffer store. It is thus possible for the second values and the filtered pilot symbols, which have previously been stored in the second buffer store, to be input into the IIR low-pass filter again, and first values which have come from the IIR low-pass filter can be written to the first buffer store.

A further preferred refinement of the invention is characterized by first and second registers. The first registers store filter coefficients which are fed to the filter stages in the low-pass filter unit during operation of the low-pass filter unit. During operation of the low-pass filter unit, the second registers can store filter coefficients which are intended to be used as filter coefficients for the low-pass filter unit at a later time. As soon as the filter coefficients which are stored in the second registers need to be used, the second registers replace the first registers, so that the filter coefficients stored in the second registers can feed the filter stages in the low-pass filter unit. Filter coefficients which are intended to be used as filter coefficients at a later time can then be written to the first registers. This refinement of the invention guarantees a high level of flexibility in order to be able to match the low-pass filter unit to changing conditions in the transmission channel.

Preferably, the filter coefficients are generated by a digital signal processor.

In one particularly preferred refinement of the invention, the hardware apparatus conditions the pilot symbols received by various RAKE fingers in a time-division multiplex mode. This means that it is possible for the hardware apparatus to process not only a CPICH signal but also all of this signal's paths detected in the mobile radio and also all detected paths for other base stations.

In line with another particularly preferred refinement of the invention, a control unit produces control signals for controlling the hardware apparatus. In particular, these are control signals for activating and deactivating the low-pass filter unit and/or control signals which determine the number of feedback loops (filter passes) for a pilot symbol in the low-pass filter unit. In addition, the control unit may be designed such that it supplies the filtered pilot symbol or a default value, particularly the value "0", to a downstream unit, particularly an MRC unit.

The use of a specific control unit is advantageous over the use of a unit which serves the same purpose but is incorporated directly into the flow of signals. In addition, the control signals produced by the control unit may be oriented to procedures taking place in the mobile radio, such as the compressed mode or the initialization of the RAKE fingers, and may thus also be used for other areas of the mobile radio.

The changes in the channel properties over time are brought about, in particular, by a relative movement from the mobile radio in relation to the base station. In the frequency domain, the pilot symbols received are in the form of a Doppler spectrum with a bandwidth which is dependent on the relative speed of the mobile radio in relation to the base station.

By taking into account the relative speed of the mobile radio in relation to the base station, it is possible to optimize the conditioning of the pilot symbols for the channel estimation. The hardware apparatus therefore preferably comprises a unit for determining the relative speed of the mobile radio with respect to the base station and/or a unit for determining the signal-to-noise ratio which is present at the receiver end. The relative speed and/or the signal-to-noise ratio can be used to stipulate the number of feedback loops (filter passes) for a pilot symbol in the low-pass filter unit.

By way of example, provision can be made for a high relative speed to involve a pilot symbol passing through just one or two filter stages in order to cause a short propagation-time delay. By contrast, the propagation-time delay when the relative speed of the mobile radio is relatively low is quite uncritical on account of the very slow channel changes in this case, and effective filtering of the pilot symbols is much more crucial, which means that it is possible to pass through a plurality of, for example, up to four filter stages in this context.

The inventive method is designed for operating the inventive hardware apparatus. In a first method step, first values are loaded from the first buffer store into the main registers in the IIR low-pass filter. In a second method step, a pilot symbol is filtered in the IIR low-pass filter. In a third method step, at least some of the second values output from the main registers are stored in the second buffer store. Next, the aforementioned three method steps are repeated at least once, with the feedback path which can be switched in supplying the respective result of the filtering from the second method step to the input of the IIR low-pass filter instead of the pilot symbol.

A channel estimator in accordance with the invention comprises a computation unit and a hardware apparatus in accordance with the invention. The computation unit is used to multiply the received pilot symbols by the complex-conjugate known pilot symbols. In line with the above equation (1), this multiplication can be used to calculate the channel parameter.

The inventive hardware apparatus is connected either upstream or downstream of the computation unit. As a result, the two arrangements do not differ.

BRIEF DESCRIPTION OF THE DRAWINGS

The invention is explained in more detail below by way of example with reference to the drawings, in which.

DETAILED DESCRIPTION OF THE PREFERRED EMBODIMENTS

Figure 1:
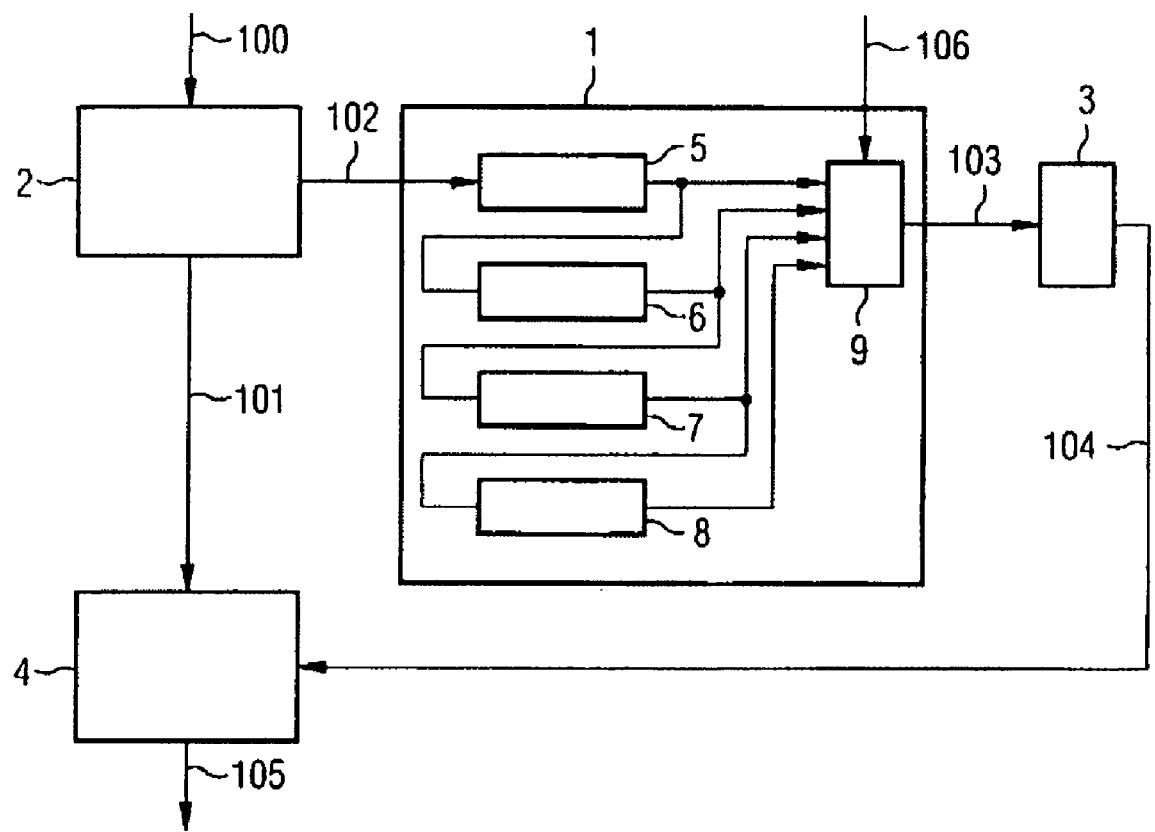
FIG. 1 shows a schematic illustration of an apparatus for conditioning pilot symbols for channel estimation and implementation thereof in a mobile radio.

FIG. 1 shows a schematic illustration of an apparatus 1 for conditioning pilot symbols for channel estimation and the incorporation thereof into a mobile radio. In the present case, the radio transmission between the base station and the mobile radio is based on the UMTS standard.

A RAKE receiver 2 in the mobile radio receives chips 100. The chips 100 are progressively supplied in the RAKE receiver 2 to a descrambling unit (descrambler), to a dispreading unit and to an "integrate & dump" unit. As a result, the chips 100 are transformed into data symbols 101 and pilot symbols 102. The pilot symbols 102 are forwarded to the apparatus 1, which subjects the pilot symbols 102 to low-pass filtering. The filtered pilot symbols 103 feed a channel estimator 3, which calculates channel parameters 104 from the filtered pilot symbols 103. On the basis of the channel parameters 104, a weighting unit 4 is used to calculate the distortion caused by the transmission channel from the data symbols 101, and symbols 105 are obtained which are available for further processing.

The apparatus 1 contains filter stages 5, 6, 7 and 8, which are each in the form of low-pass filters, in a cascade structure, i.e. in series. In addition, the outputs of the filter stages 5, 6, 7 and 8 are respectively connected to an input on a 4:1 multiplexer 9. The 4:1 multiplexer 9 is controlled by means of a control signal 106 which can be provided by a digital signal processor, for example. The output of the 4:1 multiplexer 9 is simultaneously the output of the apparatus 1.

The connection of the components in the apparatus 1 makes it possible for the number of filter stages through which the pilot symbols 102 are intended to pass before they are processed further by the channel estimator 3 to be variable.

The more filter stages traversed, the more effective is the noise suppression attained by the low-pass filtering. However, this also lengthens the signal propagation time, which means that the filtered pilot symbols 103 are available only with a corresponding time delay.

By way of example, the decision criterion used for the number of filter stages through which the pilot symbols 102 are intended to pass may be the relative speed between the mobile radio and the base station. While the relative speed is high, the 4:1 multiplexer 9 is set such that the filtered pilot symbols 103 are tapped off at the output of a filter stage which is arranged a relatively long way ahead in the series circuit. This keeps down the propagation-time delay for the filtered pilot symbols 103 which is caused by the low-pass filtering. At a low relative speed, good filtering of the pilot symbols 102 is possible, which means that the pilot symbols 102 pass through a relatively large number of filter stages before they get to the channel estimator 3. It is therefore necessary to balance effective noise suppression against tolerable signal propagation-time delay in order to determine the number of filter stages through which the pilot symbols 102 need to pass.

Figure 2A:
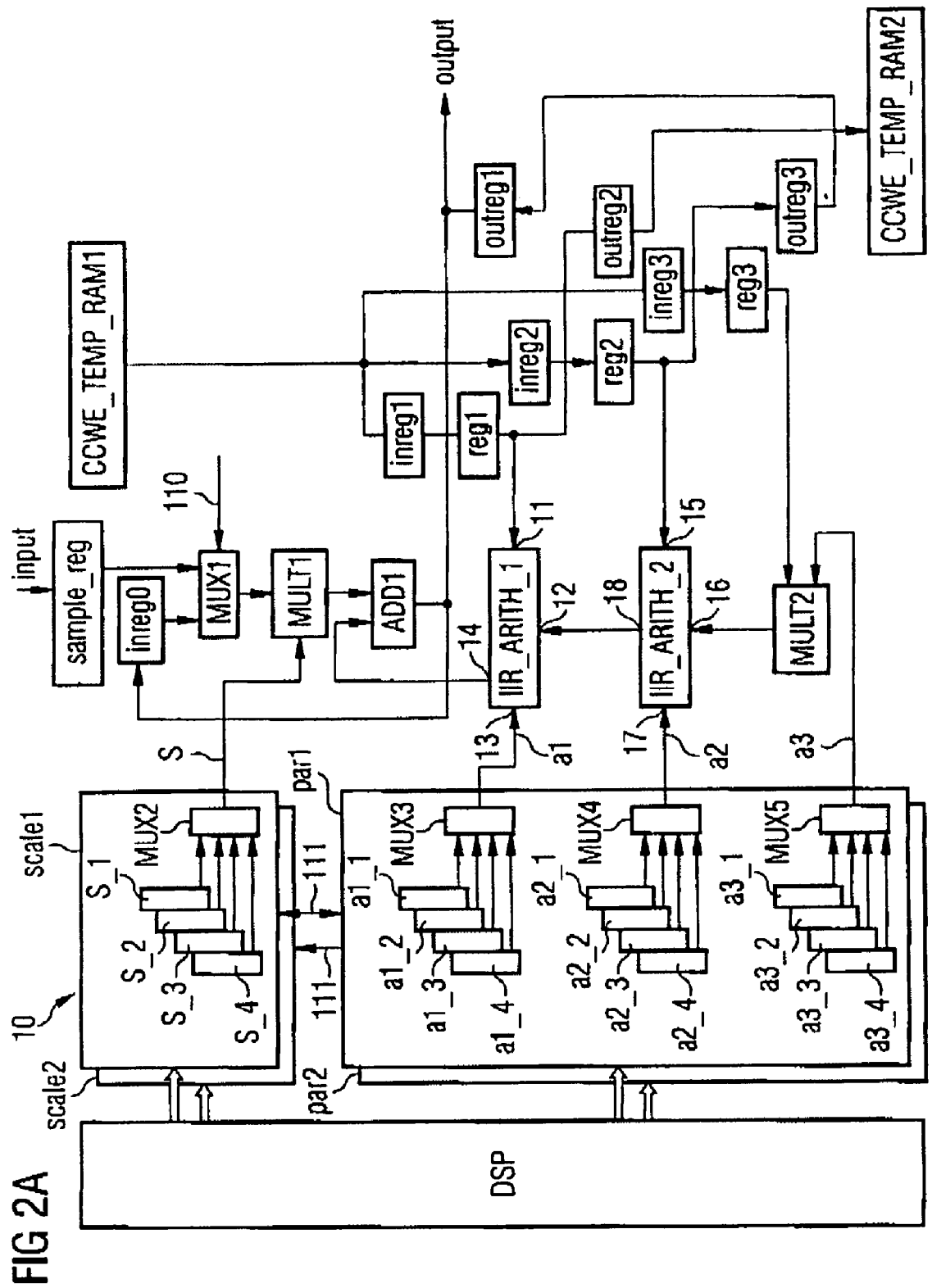
FIG. 2A shows a schematic diagram of an exemplary embodiment of the inventive hardware apparatus.

FIG. 2A shows the schematic diagram of an apparatus 10 as an exemplary embodiment of the inventive hardware apparatus. In the case of this exemplary embodiment of the invention, the radio transmission between the base station and the mobile radio is based on the UMTS standard.

Arranged downstream of an input, input, on the apparatus 10 is an input register sample_reg, which is connected to an input 2:1 multiplexer MUX1. A control input on the 2:1 multiplexer MUX1 has a control signal 110 applied to it. The output of the 2:1 multiplexer MUX1 is connected to an input on a multiplier MULT1. A further input on the multiplier MULT1 has a scaling factor s applied to it. Connected downstream of the multiplier MULT1 is an input on an adder ADD1. From the output of the adder ADD1, lines are routed to an input register inreg0, to an output register outreg1 and to an output, output, on the apparatus 10. The input register inreg0 feeds a further input on the 2:1 multiplexer MUX1.

In addition, the apparatus 10 has a buffer store CCWE_TEMP_RAM1. The input registers inreg1, inreg2 and inreg3 are fed by the buffer store CCWE_TEMP_RAM1. Connected downstream of the input registers inreg1, inreg2 and inreg3 is a respective one of the main registers (delay elements) reg1, reg2 and reg3.

From the output of the main register reg1, connections are routed both to an input 11 on a computation unit IIR_ARITH_1 and to an output register outreg2. From the output of the main register reg2, connections are routed both to an input 15 on a computation unit IIR_ARITH_2 and to an output register outreg3. The output of the main register reg3 is connected to an input on a multiplier MULT2.

The output registers outreg1, outreg2 and outreg3 feed a buffer store CCWE_TEMP_RAM2.

Figure 2B:
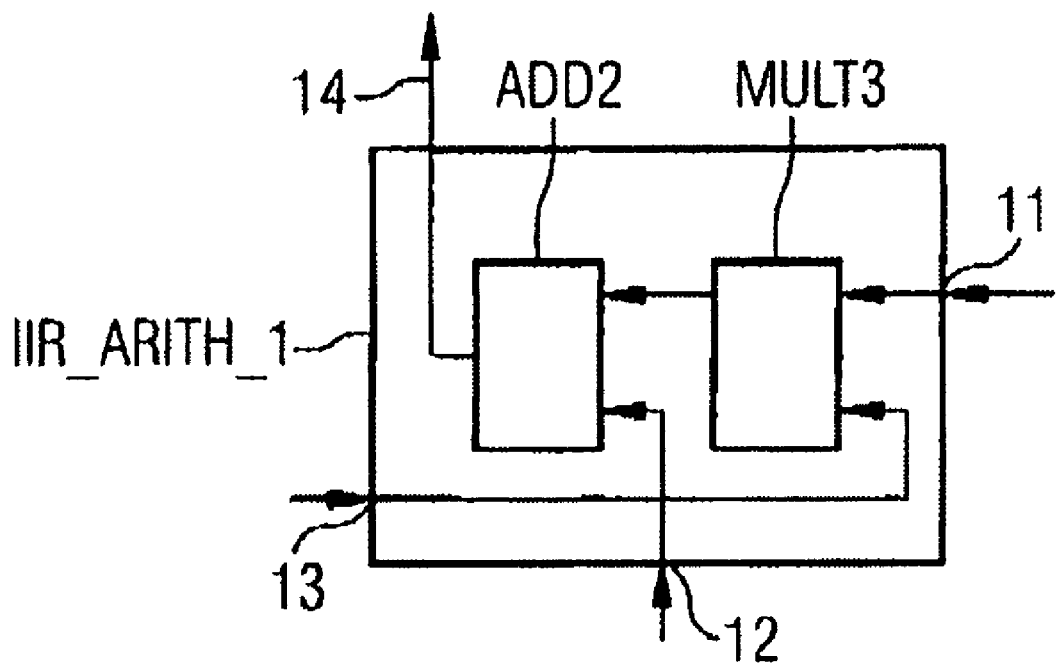
FIG. 2B shows a schematic diagram of the computation unit IIR_ARITH_1.
Figure 2C:
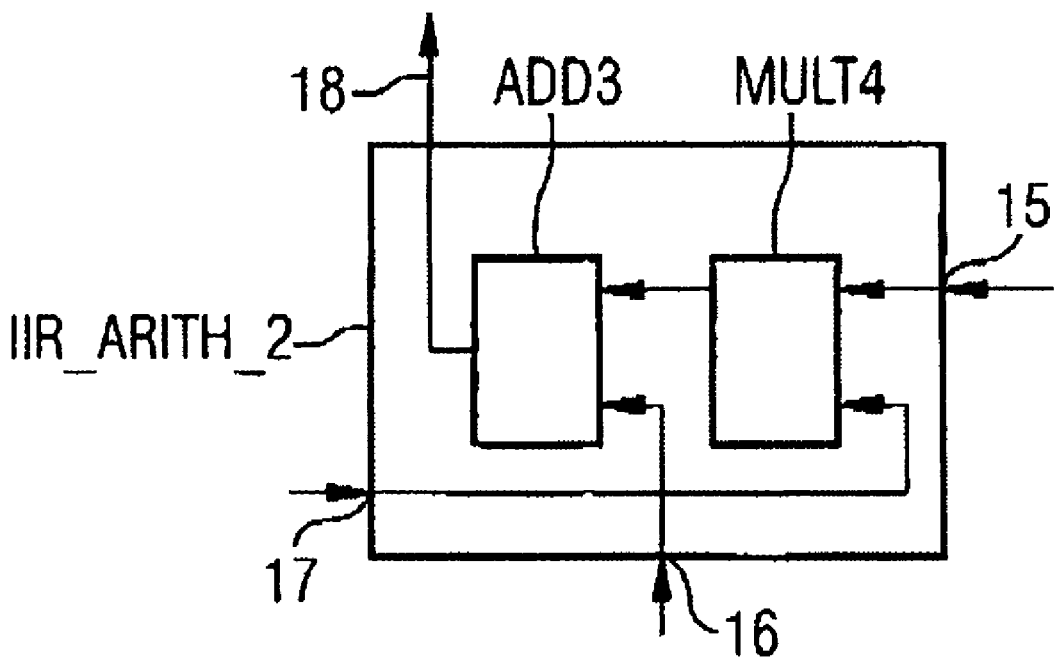
FIG. 2C shows a schematic diagram of the computation unit IIR_ARITH_2.

The computation units IIR_ARITH_1 and IIR_ARITH_2 have the same design. Their schematic diagrams are shown in FIGS. 2B and 2C.

The computation units IIR_ARITH_1 and IIR_ARITH_2 have inputs 11, 12 and 13, and 15, 16 and 17, and also an output 14 or 18, respectively. In addition, the computation unit IIR_ARITH_1 or IIR_ARITH_2 contains a multiplier MULT3 or MULT4 and an adder ADD2 or ADD3. The input side of the multiplier MULT3 or MULT4 is connected to the inputs 11 and 13 or 15 and 17, respectively. The input side of the adder ADD2 or ADD3 is connected to the input 12 or 16 and to the output of the multiplier MULT3 or MULT4 respectively. From the output of the adder ADD2 or ADD3, a connecting line is routed to the output 14 or 18 respectively.

Input 12 of the computation unit IIR_ARITH_1 is connected to the output 18 of the computation unit IIR_ARITH_2. The input 13 is provided with a filter coefficient a1. The output 14 is routed to an input on the adder ADD1.

The input 16 of the computation unit IIR_ARITH_2 is connected to the output of the multiplier MULT2. The input 17 has a filter coefficient a2 applied to it.

An input on the multiplier MULT2 has a filter coefficient a3 applied to it.

The scaling factor s is transmitted to the multiplier MULT1 using a unit scale1. The unit scale1 stores scaling factors in registers s_1, s_2, s_3 and s_4. The scaling factors have been calculated beforehand by a digital signal processor DSP and have been stored in the registers s_1, s_2, s_3 and s_4. A 4:1 multiplexer MUX2 connects the necessary scaling factor to the multiplier MULT 1.

A further unit scale2 contains "shadow registers". The unit scale2 has the same design as the unit scale1. During the time in which the scaling unit scale1 is used to provide the scaling factor s, the digital signal processor DSP is able to store scaling factors which are required at a later time in the unit scale2. A control signal 111 indicates when the functions of the units scale1 and scale2 are interchanged.

The filter coefficients a1, a2 and a3 are likewise calculated by the digital signal processor DSP and are then stored in a unit par1. For the filter coefficient a1, the registers a1_1, a1_2, a1_3 and a1_4 are provided in the unit par1. Correspondingly, the filter coefficients a2 and a3 are stored in the registers a2_1, a2_2, a2_3 and a2_4, and a3_1, a3_2, a3_3 and a3_4, respectively. Using 4:1 multiplexers MUX3, MUX4 and MUX5, a respective register value is connected to the multipliers MULT3, MULT4 and MULT2.

A further unit par2 contains shadow registers for the scaling factors a1, a2 and a3. The unit par2 has the same design as the unit par1. The control signal 111 indicates which of the units par1 and par2 has been activated.

The text below describes the way in which the apparatus 10 works.

The fundamental idea of the apparatus 10 is based on the way in which the apparatus 1 shown in FIG. 1 works, i.e. the number of filter passes by the pilot symbols is variable. In the apparatus 10, however, this is not produced by a cascaded structure of low-pass filters, as in the apparatus 1, but rather by just one low-pass filter which is operated using a time-division multiplex method.

One particular characteristic of the apparatus 10 is the 2:1 multiplexer MUX1, which selects either the pilot symbol which is received at the input, input, and is stored in the input register sample_reg or selects the pilot symbol which is in the input register inreg0 and has already been filtered beforehand for further processing. The setting for the 2:1 multiplexer MUX1 is stipulated by means of the control signal 110. The control signal 110 can be produced, by way of example, by a finite state machine which stipulates the order of events in the time-division multiplexed filter cascade.

The pilot symbol connected by the 2:1 multiplexer MUX1 is first multiplied by the scaling factor s in a multiplier MULT1 and is then subjected to low-pass filtering.

The low-pass filter contained in the apparatus 10 is a third-order IIR filter. The three main registers reg1, reg2 and reg3 characterize a filter stage's output which is delayed by one, two or three time units and is injected into the input again. In addition, the low-pass filter's transfer function is determined by the filter coefficients a1, a2 and a3.

The values which the main registers reg1, reg2 and reg3 require for each filter pass are stored in the buffer store CCWE_TEMP_RAM1 and are made available to the main registers reg1, reg2 and reg3 via the input registers inreg1, inreg2 and inreg3.

Directly after a filter pass (a processing clock cycle), the pilot symbol previously selected by the 2:1 multiplexer MUX1 and now filtered is available at the output, output, and can be tapped off there. This filtered pilot symbol is also written to the input register inreg0 and to the output register outreg1. Furthermore, the value which is passed through the main register reg1 during the filter process is written to the output register outreg2, and the value which has passed through the main register reg2 is written to the output register outreg3. The contents of the output registers outreg1, outreg2 and outreg3 are buffer-stored in the buffer store CCWE_TEMP_RAM2. At a later time, they can be loaded again from there via the input memories inreg1, inreg2 and inreg3 into the main registers reg1, reg2 and reg3.

Subsequently, either a new pilot symbol received at the input, input, and stored in the input register sample_reg or the pilot symbol which is in the input register inreg0 and has already been filtered beforehand can be filtered.

While the 2:1 multiplexer MUX1 has been set such that the pilot symbol stored in the input register inreg0 passes through the low-pass filter in the apparatus 10, this can be regarded as having the same effect in terms of result as filtering an output value from a filter stage 5, 6 or 7, shown in FIG. 1, using the respective downstream filter stage.

In one particular embodiment of the apparatus 10, each pilot symbol received at the input, input, is filtered four times in the apparatus 10. This corresponds to the progressive filtering, shown in FIG. 1, by the filter stages 5, 6, 7 and 8. In addition, this embodiment involves the operating clock rate for the apparatus 10 being much higher than the chip rate of the CPICH signal received by the mobile radio. By way of example, the operating clock rate at which the apparatus 10 is operated is 124.8 MHz. In the case of UMTS systems, the chip rate is generally 3.84 MHz.

A pilot symbol passes through the low-pass filter in the apparatus 10 once during an operating clock cycle. Consequently, four operating clock cycles in the apparatus 10 are required in order to filter a pilot symbol four times, which corresponds to the pass through the filter stages 5, 6, 7 and 8 in FIG. 1.

The order of events in the filtering of a newly arriving pilot symbol using the apparatus 10 (shown in FIG. 2A) with four-fold time-division multiplexing (or using the four filter stages 5, 6, 7 and 8 in the apparatus 1 shown in FIG. 1) can be summarized in the manner below.

First Time-Division Multiplexed Filtering (First Operating Clock Cycle) in the Apparatus 10 (or Filtering in the Filter Stage 5):

From the buffer store CCWE_TEMP_RAM1, the register contents based on the last filtering performed are loaded into the input registers inreg1, inreg2 and inreg3. When the pilot symbol arrives (input register sample_reg), the contents are transferred to the main registers reg1, reg2 and reg3, the arithmetic calculations are performed, and in the next step the events are transferred via the output registers outreg1, outreg2 and outreg3 to the buffer store CCWE_TEMP_RAM2. All operating steps are performed using the pipeline method, which means that effectively only one operating clock cycle is required. The output values are available in the buffer store CCWE_TEMP_RAM2 for filtering the next pilot symbol which arrives. Prior to filtering the next pilot symbol which arrives, the roles of the buffer stores CCWE_TEMP_RAM1 and CCWE_TEMP_RAM2 need to be reversed.

Second Time-Division Multiplexed Filtering (Second Operating Clock Cycle) in the Apparatus 10 (or Filtering in the Filter Stage 6):

In the second operating clock cycle, the result of the filtering by the first time-division multiplexed filter stage needs to pass through the second time-division multiplexed filter stage. The result of the first time-division multiplexed filter stage, which is stored in the input register inreg0, is supplied to the second filter stage via the 2:1 multiplexer MUX1 (in contrast to the first time-division multiplexed filtering, in which the newly arrived pilot symbol was processed). In addition, the register contents for the second time-division multiplexed filtering of the preceding pilot symbol are loaded from the buffer store CCWE_TEMP_RAM1 into the input registers inreg1, inreg2 and inreg3, from where they are transferred to the main registers reg1, reg2 and reg3. Next, the contents of the input register inreg0 and of the main registers reg1, reg2 and reg3 are used to perform the arithmetic procedures, the contents of the output registers outreg1, outreg2 and outreg3 are loaded into the buffer store CCWE_TEMP_RAM2, and the result of the filtering, which can be tapped off at the output, output, is transferred to the input register inreg0, where it is available as an input signal for the third time-division multiplexed filtering.

The third and fourth time-division multiplexed filtering (or the filtering in the filter stages 7 and 8) is performed in line with the method described above.

Upon the next incoming pilot symbol, the roles of the buffer stores CCWE_TEMP_RAM1 and CCWE_TEMP_RAM2 are reversed.

In addition, the time-division multiplexing mode of the apparatus 10 allows not just a CPICH signal but also all of this signal's transmission paths detected in the mobile radio to be handled using the apparatus 10. To detect the various transmission paths, the mobile radio's RAKE receiver orients the respective RAKE finger towards a transmission path. By way of example, a total of 32 RAKE fingers are oriented towards the transmission paths. For every RAKE finger, four successive operating clock cycles in the apparatus 10 are reserved. During these four operating clock cycles, a pilot symbol provided by the RAKE finger is filtered four times. A pilot symbol for the next RAKE finger is then filtered four times.

Figure 3:
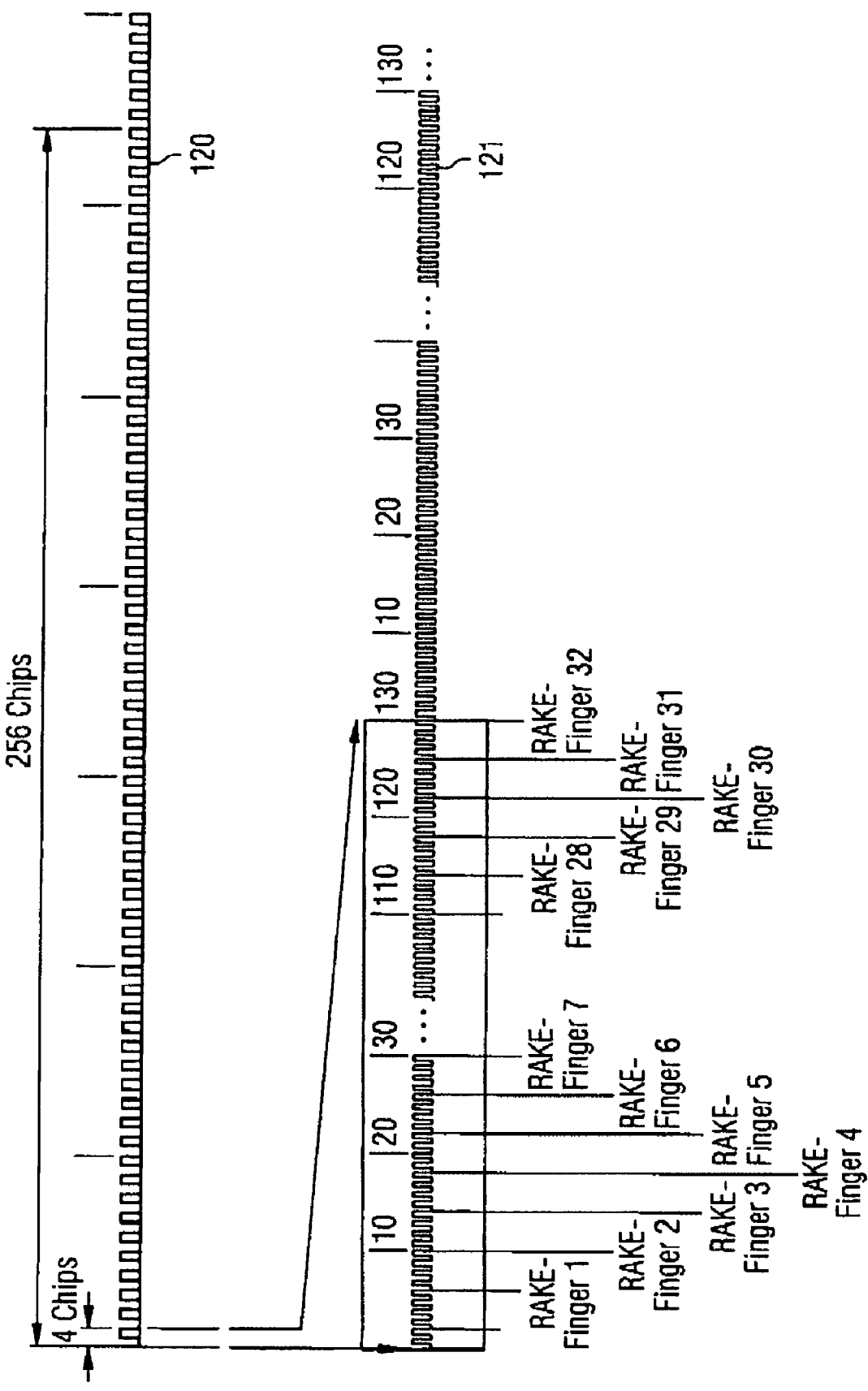
FIG. 3 shows a timing diagram for the processing of the pilot symbols provided by the RAKE fingers by the apparatus (10)

The procedure described above is shown in FIG. 3. The top part of FIG. 3 shows the chip rate 120 in a UMTS system. The bottom part shows the operating clock 121 in the apparatus 10.

FIG. 3 shows that pilot symbols are generated by the RAKE fingers only during the first four chips in an interval comprising 256 chips. On account of the high operating clock rate of the apparatus 10, all of the pilot symbols generated by the 32 RAKE fingers in this interval can be handled by the apparatus 10 during the first four chips. In this case, a pilot symbol is generated by a RAKE finger in every fourth operating clock cycle. This pilot symbol is subsequently available at the input, input, on the apparatus 10 and can be conditioned for the channel estimation during four operating clock cycles (four time-division multiplexed filter stages or four filter stages).

While the 32 pilot symbols are being conditioned, the values in the output registers outreg1, outreg2 and outreg3 are written to the buffer store CCWE_TEMP_RAM2 after each individual time-division multiplexed filter stage (four filter stages). As soon as the RAKE fingers produce pilot symbols again after a pause of 252 chips, the functions of the two buffer stores CCWE_TEMP_RAM1 and CCWE_TEMP_RAM2 are reversed, which means that the buffer store CCWE_TEMP_RAM2 now delivers the values for the input memories inreg1, inreg2 and inreg3, and the values in the output memories outreg1, outreg2 and outreg3 are stored in the buffer store CCWE_TEMP_RAM 1.

The values stored in the buffer stores CCWE_TEMP_RAM1 and CCWE_TEMP_RAM2 are complex numbers whose real and imaginary parts each comprise 16 bits. The result of this is that the buffer stores CCWE_TEMP_RAM1 and CCWE_TEMP_RAM2 each need to have a minimum storage capacity of $32 \times 4 \times 3 \times 2 \times 16$ bits. In the above product, the first factor (32) relates to the number of RAKE fingers, the second factor (4) relates to the number of filter passes per pilot symbol, the third factor (3) relates to the number of main registers reg1, reg2 and reg3, and the last two factors ($2 \times 16$ bits) relate to the word length of the values which are required for the main memories reg1, reg2 and reg3.

In addition, the scaling factor s and the filter coefficients a1, a2 and a3 are required in order to operate the apparatus 10. The scaling factor s is obtained from the unit scale1 or scale2. The filter coefficients a1, a2 and a3 are provided by the unit par1 or par2. Four different values (four filter stages) are respectively available both for the scaling factor s and for the filter coefficients a1, a2 and a3. These values are progressively forwarded to the respective multipliers MULT1, MULT2, MULT3 and MULT4 within a pilot symbol's four filter passes using the 4:1 multiplexers MUX2, MUX3, MUX4 and MUX 5.

While the values stored in the units scale1 and par1 are being used to operate the apparatus 10, for example, the digital signal processor DSP can calculate new values for the scaling factor s and the filter coefficients a1, a2 and a3 and can store these values in the registers of the units scale2 and par2. When a time marker arrives, for example the start of a frame or the start of a TTI, the units scale2 and par2 can then be replaced by the units scale1 and par1.

Figure 4:
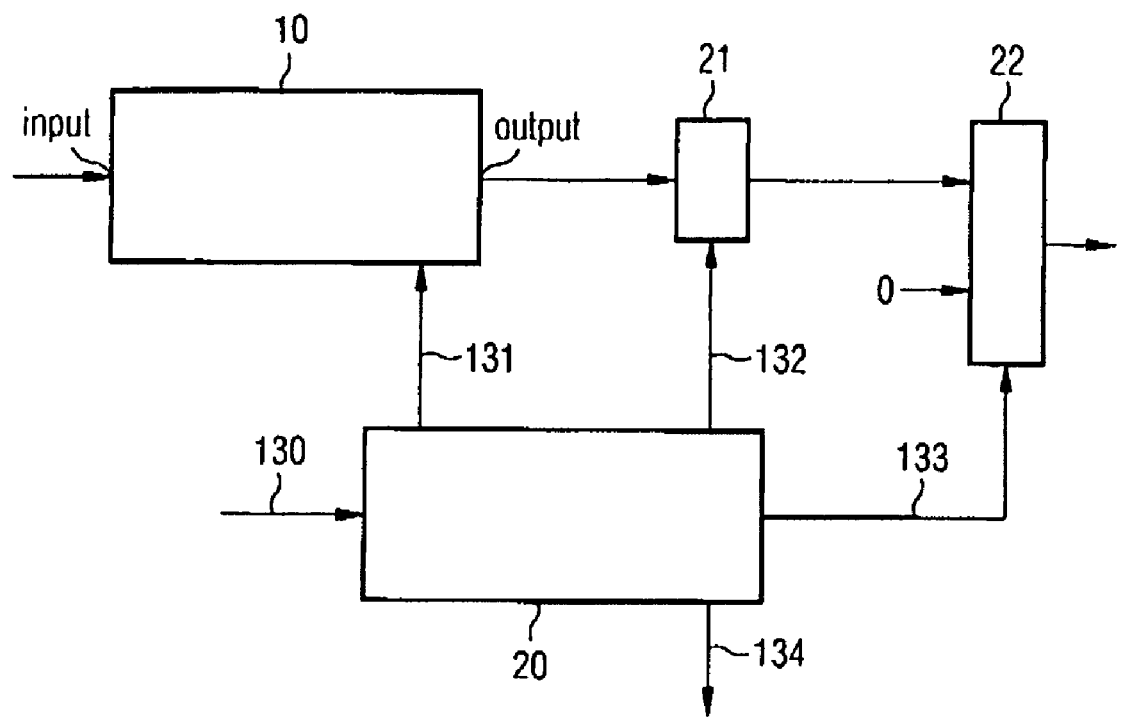
FIG. 4 shows a schematic illustration of the implementation of the apparatus (10) in a mobile radio.

FIG. 4 schematically shows the implementation of the apparatus 10 in the mobile radio. The apparatus 10 is controlled by a control unit 20. The control unit 20 receives control signals 130 from other units in the mobile radio, and these control signals are used by the control unit 20 to generate control signals 131, 132, 133 and 134.

The control signal 131 can be used to activate and deactivate the filter function in the apparatus 10. By way of example, the filter function is deactivated in compressed mode if the mobile radio is being operated at another frequency extraneous to the cell (measurement on monitor cells).

The control signal 132 is used to control a gate 21 which is connected downstream of the output, output, of the apparatus 10. The gate 21 selects the pilot symbol provided at the output, output, of the apparatus 10, said pilot symbol being intended to be processed further. In the present case, the gate 20 undertakes the function which befits the 4:1 multiplexer 9 in FIG. 1. By way of example, the four filter stages 5, 6, 7 and 8 need to reach a steady state after the initialization of a RAKE finger before the filter results can be used further. During this period of time, which can be as much as a period comprising four pilot symbols, the output of one of the filter stages 5 or 6 can be routed out for further use by default, since these filter stages actually deliver a usable value after the period comprising one or two pilot symbols.

The output of the gate 21 is connected to an input on a 2:1 multiplexer 22. The other input of the 2:1 multiplexer 22 has the value 0 applied to it. The 2:1 multiplexer 22 is controlled by the control signal 133. The 2:1 multiplexer 22 allows the incoming pilot symbols to be weighted with the factor 0. This can be performed, by way of example, in compressed mode or after a new RAKE finger has been initialized. By way of example, during the first pilot symbols after a RAKE finger has been initialized, the contributions made by this RAKE finger to the maximum ratio combining are weighted with "zero" until the associated filter stages have reached a steady state.

The control signal 134 is used to control a downstream MRC unit. This allows the MRC unit to be disconnected entirely in compressed mode.

We claim:

1. A hardware apparatus for conditioning pilot symbols for channel estimation, wherein the pilot symbols are transmitted by a base station and are received by a mobile radio, and the pilot symbols are known to the mobile radio, the hardware apparatus comprising:
    a time-division multiplex low-pass filter unit configured to filter the received pilot symbols, and having, between its input and its output, a switchable feedback loop configured to vary the number of filter passes of the pilot symbols through the low-pass filter,
    wherein the feedback loop is configured to produce at least two low-pass filter stages in time-division multiplex mode with filter coefficients and scaling factors.

2. A hardware apparatus for conditioning pilot symbols for channel estimation, wherein the pilot symbols are transmitted by a base station and are received by a mobile radio, and the pilot symbols are known to the mobile radio, the hardware apparatus comprising:
    a time-division multiplexed low-pass filter unit configured to filter the received pilot symbols, and having, between its input and its output, a switchable feedback loop configured to vary the number of filter passes of the pilot symbols through the low-pass filter; and
    a multiplexer connected upstream of the low-pass filter unit, having a first input coupled to the output of the low-pass filter unit, and a second input configured to be fed the received pilot symbols.

3. The hardware apparatus according to claim 1, wherein the low-pass filter unit has an IIR low-pass filter configured to produce the at least two filter stages in time-division multiplex mode.

4. The hardware apparatus according to claim 3, further comprising:
    a first buffer store configured to provide first values for main registers in the IIR low-pass filter, and
    a second buffer store configured to buffer-store second values which are output from the main registers in the IIR low-pass filter.

5. The hardware apparatus according to claim 4, wherein a pilot symbol filtered using the IIR low-pass filter is stored in the second buffer store.

6. The hardware apparatus according to claim 4, wherein the function of the first buffer store is interchangeable with the function of the second buffer store.

7. The hardware apparatus according to claim 5, wherein the function of the first buffer store is interchangeable with the function of the second buffer store.

8. The hardware apparatus according to claim 1, further comprising:
    first registers configured to store the filter coefficients, wherein the low-pass filter unit is fed, during its operation, with the filter coefficients; and
    second registers, in which it is possible to store the filter coefficients during the operation of the low-pass filter unit,
    wherein the functions of the first registers and of the second registers are interchangeable.

9. The hardware apparatus according to claim 8, further comprising:
    a digital signal processor configured to generate the filter coefficients.

10. The hardware apparatus according to claim 1, wherein the hardware apparatus conditions the pilot symbols received by various RAKE fingers in a time-division multiplex mode.

11. A hardware apparatus for conditioning pilot symbols for channel estimation, wherein the pilot symbols are transmitted by a base station and are received by a mobile radio, and the pilot symbols are known to the mobile radio, the hardware apparatus comprising:
- a time-division multiplexed low-pass filter unit configured to filter the received pilot symbols, and having, between its input and its output, a switchable feedback loop configured to vary the number of filter passes of the pilot symbols through the low-pass filter; and
- a control unit configured to control the hardware apparatus, wherein the control unit is configured to activate and deactivate the low-pass filter unit, in particular, and/or determine the number of feedback loops and filter stages through which a pilot symbol needs to pass and/or supply the filtered pilot symbol or a default value, particularly the value "0," to a downstream unit, particularly a maximal-ratio combining unit.

12. The hardware apparatus according to claim 1, further comprising:
- a unit configured to determine a relative speed of the mobile radio with respect to the base station, and/or
- a unit configured to determine a signal-to-noise ratio which is present at the receiver output, wherein
- a number of feedback loops or filter stages through which a pilot symbol needs to pass in the low-pass filter unit is dependent on the relative speed and/or the signal-to-noise ratio.

13. A method for operating a hardware apparatus according to claim 4, comprising:
(1) loading first values from the first buffer store into the main registers in the IIR low-pass filter;
(2) filtering a pilot symbol in the IIR low-pass filter;
(3) storing at least some of the second values output from the main registers in the second buffer store; and
(4) repeating method steps (1) to (3) at least once, with the feedback path which can be switched in supplying the result of the filtering from method step to the IIR low-pass filter instead of the pilot symbol.

14. A channel estimator comprising:
- a computation unit configured to multiply received pilot symbols by complex-conjugate known pilot symbols; and
- a hardware apparatus configured to condition pilot symbols for channel estimation and comprising a time-division multiplexed low-pass filter unit configured to filter pilot symbols transmitted by a base station,
- wherein the time-division multiplexed low-pass filter unit comprises, between its input and its output, a switchable feedback loop configured to vary the number of filter passes of the pilot symbols through the low-pass filter, and further configured to produce at least two low-pass filter stages in time-division multiplex mode with filter coefficients and scaling factors
- wherein the computation unit and the hardware apparatus are connected in series.

15. A method for operating a hardware apparatus for conditioning pilot symbols for channel estimation, wherein the pilot symbols are transmitted by a base station and are received by a mobile radio, and the pilot symbols are known to the mobile radio, wherein the hardware apparatus comprises a time-division multiplexed low-pass filter unit comprising an IIR low-pass filter, and between its input and its output, a switchable feedback loop, a first buffer store for providing first values for main registers in the IIR low-pass filter, and a second buffer store for buffer-storing second values which are output from the main registers in the IIR low-pass filter, the method comprising:
(1) loading first values from the first buffer store into the main registers in the IIR low-pass filter;
(2) filtering a pilot symbol in the IIR low-pass filter, wherein the number of filter passes by the pilot symbol through the low-pass filter is variable;
(3) storing at least some of the second values output from the main registers in the second buffer store; and
(4) repeating method steps (1) to (3) at least once, with the feedback path which can be switched in supplying the result of the filtering from method step to the IIR low-pass filter instead of the pilot symbol.

16. The method according to claim 15, wherein
the feedback loop is configured to produce at least two low-pass filter stages in time-division multiplex mode with various filter coefficients and scaling factors.

17. The method according to claim 15, wherein a pilot symbol filtered using the IIR low-pass filter is stored in the second buffer store.

18. The method according to claim 15, wherein
the function of the first buffer store is interchangeable with the function of the second buffer store.

19. The method according to claim 15, wherein
the hardware apparatus conditions the pilot symbols received by various RAKE fingers in a time-division multiplex mode.

20. The hardware apparatus according to claim 1, wherein the number of filter passes by the pilot symbols is based on a relative speed between the mobile radio and the base station.

21. The method according to claim 15, wherein the number of filter passes by the pilot symbols is based on a relative speed between the mobile radio and the base station.

22. A channel estimator comprising:
- a computation unit configured to multiply received pilot symbols by complex-conjugate known pilot symbols; and
- a hardware apparatus for conditioning pilot symbols for channel estimation and comprising a time-division multiplexed low-pass filter unit configured to filter pilot symbols transmitted by a base station;
- wherein the time-division multiplexed low-pass filter unit comprises, between its input and its output, a switchable feedback loop configured to vary the number of filter passes of the pilot symbols through the low-pass filter, and a multiplexer connected upstream of the low- pass filter unit, having a first input coupled to the output of the low-pass filter unit, and a second input configured to be fed the received pilot symbols,
- wherein the computation unit and the hardware apparatus are connected in series.

* * * * *

UNITED STATES PATENT AND TRADEMARK OFFICE
CERTIFICATE OF CORRECTION

PATENT NO. : 7,636,374 B2
APPLICATION NO. : 10/850484
DATED : December 22, 2009
INVENTOR(S) : Becker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1134 days.

Signed and Sealed this

Ninth Day of November, 2010

David J. Kappos
*Director of the United States Patent and Trademark Office*